United States Patent
Vier

(10) Patent No.: US 12,070,909 B2
(45) Date of Patent: Aug. 27, 2024

(54) METHOD FOR PRODUCING A THREE-DIMENSIONAL PRODUCT

(71) Applicant: Ottobock SE & Co. KGaA, Duderstadt (DE)

(72) Inventor: Leonard Vier, Nörten-Hardenberg (DE)

(73) Assignee: OTTOBOCK SE & CO. KGAA, Duderstadt (DE)

(*) Notice: Subject to any disclaimer, the term of this patent is extended or adjusted under 35 U.S.C. 154(b) by 0 days.

(21) Appl. No.: 17/697,345

(22) Filed: Mar. 17, 2022

(65) Prior Publication Data

US 2022/0379567 A1   Dec. 1, 2022

(30) Foreign Application Priority Data

Mar. 25, 2021 (DE) .................. 10 2021 107 615.3

(51) Int. Cl.
| | |
|---|---|
| B29C 64/40 | (2017.01) |
| B29C 64/209 | (2017.01) |
| B33Y 10/00 | (2015.01) |
| B33Y 30/00 | (2015.01) |
| B33Y 40/00 | (2020.01) |

(52) U.S. Cl.
CPC ............ *B29C 64/40* (2017.08); *B29C 64/209* (2017.08); *B33Y 10/00* (2014.12); *B33Y 30/00* (2014.12); *B33Y 40/00* (2014.12)

(58) Field of Classification Search
CPC ........ B33Y 10/00; B33Y 40/00; B29C 64/209
See application file for complete search history.

(56) References Cited

U.S. PATENT DOCUMENTS

| | | | | |
|---|---|---|---|---|
| 2002/0028520 | A1* | 3/2002 | Boschetti | C04B 38/009 502/402 |
| 2002/0105080 | A1* | 8/2002 | Speakman | H01M 10/0565 438/609 |
| 2007/0037903 | A1* | 2/2007 | Swift | C08J 5/005 524/495 |
| 2009/0026942 | A1* | 1/2009 | Miyazawa | H10K 59/124 313/504 |
| 2016/0067918 | A1* | 3/2016 | Millar | B29C 64/106 425/375 |
| 2018/0057682 | A1* | 3/2018 | Angelini | B29C 64/40 |

FOREIGN PATENT DOCUMENTS

| | | | | |
|---|---|---|---|---|
| JP | 4038065 | B2 * | 1/2008 | B41M 5/504 |
| WO | 2019199899 | A1 | 10/2019 | |

OTHER PUBLICATIONS

Molecular Motion https://byjus.com/chemistry/molecular-motion/#:~:text=They%20can%20show%20all%20the,molecules%20move%20in%20certain%20directions. (Year: 2020).*
Printing direction dependent microstructures in direct ink writing (Year: 2020).*
Large Scale Rapid Liquid Printing (Year: 2017).*

* cited by examiner

*Primary Examiner* — Farah Taufiq
(74) *Attorney, Agent, or Firm* — WC&F IP

(57) ABSTRACT

A three-dimensional product is produced by providing a support medium in a container, introducing a production material into the support medium by means of the at least one insertion nozzle, and curing the production material. In the process, the support medium contains particles made of solid matter.

22 Claims, 3 Drawing Sheets

METHOD FOR PRODUCING A THREE-DIMENSIONAL PRODUCT

FIELD OF THE INVENTION

The invention relates to a method for producing a three-dimensional product, the method comprising the following steps: a) providing a support medium in a container, b) introducing a production material into the support medium by means of at least one insertion nozzle and c) curing the production material.

BACKGROUND

Such methods constitute additive manufacturing processes and were developed, for example, by the MIT. They were published under the key term "Rapid Liquid Printing".

Such a method for producing orthopedic products is disclosed in WO 2020/069817 A1, for example.

However, it is a disadvantage that the known method offers only limited possibilities for influencing the texture of the surface of the product produced in this manner. In particular, insertion nozzles are disclosed in DE 10 2020 118 034, which has not been pre-published, which feature additional tools in the vicinity of the opening through which the production material is introduced into the support medium. These tools can be used, for example, to smooth at least one lateral surface of the produced product, thereby creating an even surface. In particular, this can prevent the production material applied in several layers from being recognisable as material applied in layers. This improves the adhesion of the various layers to each other and harmonizes the visual impression. The printing process and the depositing of the production material in webs creates a waviness in the low-frequency range, which leads to a deviation in the shape of the component, but not to a micro-structuring of the surface.

In many applications, products made of elastic and flexible materials in particular are made using a casting or dipping method. Here, the material is filled into a mould or applied to a dipping core. These elements have surfaces whose texture directly influences the texture of the produced product. Given that such an object is not provided in the methods described here, this possibility is ruled out.

SUMMARY

The invention therefore aims to improve the method in such a way that the texture of the surface of the produced product can be influenced.

In this case, the object to be produced is created in a container filled with a support medium, for example in the form of a gel suspension or another material which does not react chemically with the production material, but serves exclusively to mechanically support the production material for as long as it has not yet cured or sufficiently cross-linked. In this case, the gel suspension is the support medium. With all of these methods, the production material is processed in a flowable form, for example liquid. With the example of "Rapid Liquid Printing", the production material in liquid or gel form, both of which are considered flowable, is introduced into the support medium at the desired positions by means of at least one insertion nozzle that can be moved three-dimensionally. Due to the density ratios between the production material and the support medium as well as the high viscosity of the support medium, the introduced production material remains in the respective position. In this way, three-dimensional objects can be "printed" by introducing the production material into the support medium at the desired position and in the desired shape, where it then cross-links, solidifies or cures. The term "curing" in the following also includes cross-linking or other reactions or changes in the properties of the production material which lead to an increase in dimensional stability or the achievement of a desired condition of the orthopedic device or component. In the case of flexible or elastic materials in particular, the flexibility or elasticity remains intact after curing. Cross-linking is understood as curing within the meaning of the invention. The advantage in comparison to conventional 3D printing processes lies, among other things, in the large number of possible production materials, including silicones that cross-link at room temperature and are available on the market. Another advantage is that the process using gel suspension makes it possible to position three-dimensional objects directly in a working space of the printer and not have to build them up layer by layer. Furthermore, the method allows for high production speeds and therefore low production costs.

Production materials include, for example, silicones and polyurethanes, but also thermoplastic materials, casting resins or other plastics. For a production material, it is only important that it can be processed and cure in an applicable form, i.e. in a flowable form, for example liquid or otherwise sprayable.

In this way, for example, prosthesis liners, prosthetic gloves, insoles and other orthopedic devices can be produced from conventional silicone easily, quickly and, if necessary, individually shaped. If thermoplastic materials are used, the mechanical stability and hardness resulting from curing may be sufficient to produce, for example, prosthesis sockets, joint protectors or stiffening elements, such as splints for orthopedic devices, in this way using this method. Prosthesis coverings and cosmeses can also be produced in this way.

During the introduction of the production material into the support medium, the support medium is preferably displaced by the production material. The particles of solid matter, which may be a granulate, for example, preferably have a wettability that results predominantly from their roughness and surface tension and that ensures that the particles are not embedded in or surrounded by the production material. To this end, the roughness and/or surface tension of the particles preferably differs from that of the production material. Accordingly, like the support medium itself, they are displaced by the introduced production material and, if necessary, by the at least one insertion nozzle. Due to their property as solids, they are displaced without changing their shape or volume. The extent to which the displacement or shifting has an effect depends on the pressure conditions, which are determined on the one hand by the support medium and on the other hand by the production material introduced. Following introduction of the production material into the support medium, at least some of the particles lie between these two materials and are therefore in contact with the production material across part of their surface. Since the particles have not changed and cannot change in shape and volume, at least some of these particles protrude into the production material. Here, the particles are selected such that they do not react with the production material or are not enclosed by it. In this way, the product to be produced obtains a structure that can depend on the number, shape and material of the particles used.

Preferably, the particles are distributed in a spatially homogeneous manner in the support medium before the production material is introduced into the support medium. This may be done, for example, by feeding a predetermined quantity of particles to the support medium and subsequently mixing or agitating the mixture until a homogeneous distribution of the particles in the support medium is achieved. This has the advantage that the influence of the particles on at least one surface, but preferably all surfaces, of the product to be produced has the same influence.

Alternatively, the particles are distributed in a spatially inhomogeneous manner in the support medium according to a predetermined spatial distribution before the production material is introduced into the support medium. This is especially advantageous if the effect that the particles are to have on the surface of the product to be produced also varies in strength at different points on the surface. The predetermined spatial distribution is preferably achieved through the use of a particle nozzle, by means of which the particles can be introduced into the container with the support medium. The support medium behaves like a liquid with respect to a nozzle moving through the support medium at a predetermined minimum speed. This means that it closes again without scarring behind the nozzle in the direction of movement of the nozzle and the path that the respective nozzle has covered through the supporting medium cannot be traced on the basis of the support medium. The particle nozzle, by means of which the particles are introduced into the support medium, are now moved through the support medium in such a way that the predetermined spatial distribution of the particles in the support medium is achieved. The quantity of particles introduced into the support medium by means of the particle nozzle is preferably adjustable, so that a different number of particles can be deposited at different points in the support medium.

In a preferred embodiment, the particles are displaced with the support medium when the production material is introduced into the support medium. This may occur on the one hand by way of the production material and on the other hand by the at least one insertion nozzle. Preferably, both the insertion valves and the introduced production material each displace a part of the support medium and the particles contained within it. It is especially preferable if this ensures that the influence of the particles on a first side of the product to be produced is smaller than on an opposite second side. The sides can also be designed as opposite sides of a wall of the product to be produced. On the second side, the product then also exhibits the structure caused by the particles. The structure is not present on the opposite first side, or it is at least much less pronounced. The strength of the influence on different sides of a wall of the product to be produced can be influenced by the selection of a path along which the insertion nozzle is moved and/or the orientation of the product in the support medium.

Advantageously, the at least one insertion nozzle features at least one tool that is arranged in such a way that at least one part of a surface of the introduced support medium is smoothed by the tool. This tool is preferably equipped in such a way that at least one previous layer of the production material is processed when a current layer is inserted. Preferably, at least the immediately preceding layer of the production material is processed when the current layer is introduced. In the methods described here, the production material is applied in several layers one after the other, which then cure to form the three-dimensional product.

Preferably, the tool mixes or smooths the current layer and the at least one previous layer and/or presses them together. To this end, it is advantageous if the at least one tool is arranged next to the insertion nozzle in the direction of movement of the insertion nozzle. In this arrangement, the at least one tool also preferably protrudes above it in the "z" direction, i.e. the longitudinal direction of the insertion nozzle. In this embodiment, the three-dimensional product to be produced preferably has a constant or at least almost constant wall thickness and/or a smooth and even surface. The contact between the individual layers is also improved.

In a preferred embodiment, the at least one insertion nozzle features the particle nozzles by means of which particles are introduced into the support medium in front of the insertion nozzle in the direction of movement of the insertion nozzle. The quantity of particles introduced into the support medium by the particle nozzles can preferably be controlled. This ensures that precisely the right amount of particles is introduced into the support medium at precisely the right point immediately prior to the introduction of the production material into the support medium.

In an advantageous embodiment, the particles have an average grain size of at least 10 μm, preferably at least 0.1 mm, especially preferably at least 0.2 mm and at most 10 mm, preferably at most 5 mm, especially preferably at most 0.63 mm. The actual size distribution depends on the desired structure to be created by the particles.

Preferably, at least 80%, preferably at least 90%, especially preferably at least 95%, are spattered or dendritic in form. This form, which can also be described as angular or rough, ensures that a wettability of the particles is low and they cannot be enclosed by the production material, or only to a limited extent.

Preferred materials are plastics or quartz sand. Of course, it is also possible to mix different materials and to use different types of particle when conducting a method described here.

It has been proven advantageous if the density of the particles lies between 0.7 g/cm$^3$ and 1.3 g/cm$^3$ and/or if the density of the particles and the viscosity of the support medium are selected in such a way that the particles remain under the influence of gravity in-situ. This ensures that a sedimentation of particles on the base of container does not occur. In general, the density of the support medium and the production material also lies between 0.7 g/cm$^3$ and 1.3 g/cm$^3$. Suitable materials for particles include, for example, polymers with a density of between 0.7 g/cm$^3$ and 1.5 g/cm$^3$ or glasses, such as quartz sand, with a density of approximately 2.6 g/cm$^3$. All densities specified are preferably the densities of the material, not the bulk densities of the particles.

Preferably, the particles exhibit a wettability that prevents an adhesion and/or embedding in the production material. It is especially preferable if the particles behave in a chemically inert manner, i.e. they do not react chemically with the support medium or the production material, in the support medium and during contact with the production material.

Advantageously, the particles have an interfacial tension of less than 400 mN/m, especially preferably less than 100 mN/m. Suitable materials include, for example, glass such as quartz sand with an interfacial tension of approximately 300 mN/m or plastics whose interfacial tension lie within the given range.

Preferably, at least two different types of particle are used, which preferably differ in particular in their shape, wherein preferably one type of particle is at least approximately spherical and the second type is at least approximately rod-shaped. An approximately spherical shape is understood to mean a shape in which the largest diameter of the particles and the smallest diameter of the particles deviate from each other by less than 10%, preferably less than 5%, especially preferably less than 2%. Conversely, an at least approximately rod-shaped particle exhibits an extension in one direction that is considerably larger, preferably at least twice as large, especially preferably at least five times as large, as the extensions in one direction, preferably all directions, perpendicular to the first.

Advantageously, the structures introduced into the product by the particles are smaller than the diameter of the production nozzle.

DESCRIPTION OF THE DRAWINGS

In the following, an example of an embodiment of the present invention will be explained in more detail by way of the attached drawings: They show FIGS. 1 to 3—different stages of the method according to an an example of an embodiment of the present invention, FIG. 4—a schematic section from FIG. 3, FIG. 5—the schematic view of a produced product and FIG. 6—a schematic sectional view through the product according to FIG. 5.

DETAILED DESCRIPTION

Figure 1:
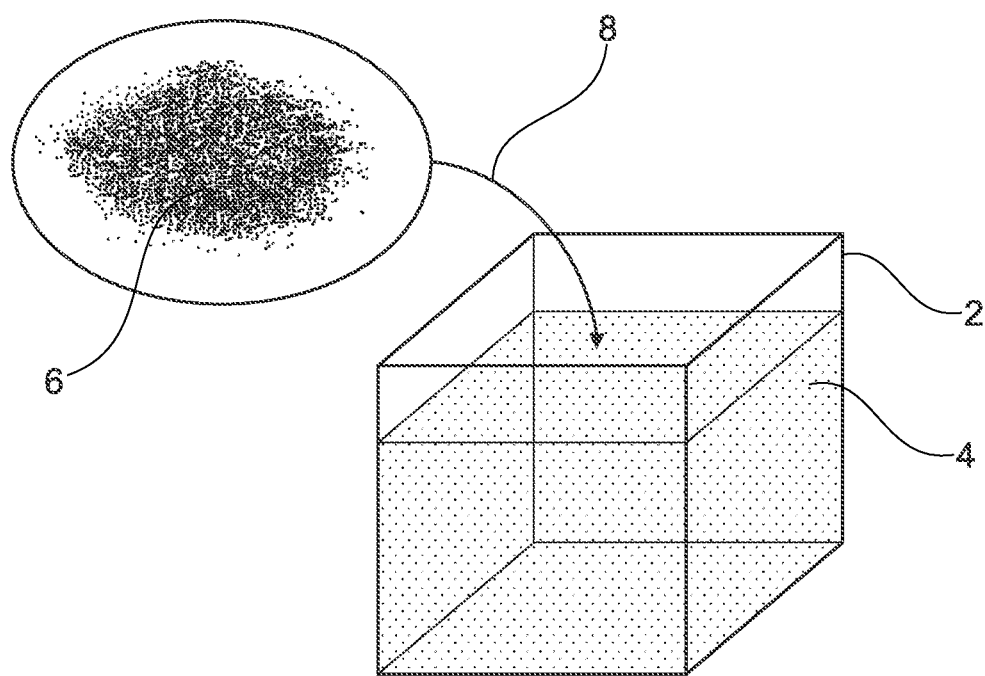

FIG. 1 depicts a container 2 in which a support medium 4 has been provided. Particles 6 are introduced into the support medium 4 in the form of a granulate, which is schematically depicted by the arrow 8. This may occur in various ways. For example, the particles 6 can be distributed homogeneously, i.e. spatially evenly, in the support medium.

Figure 2:
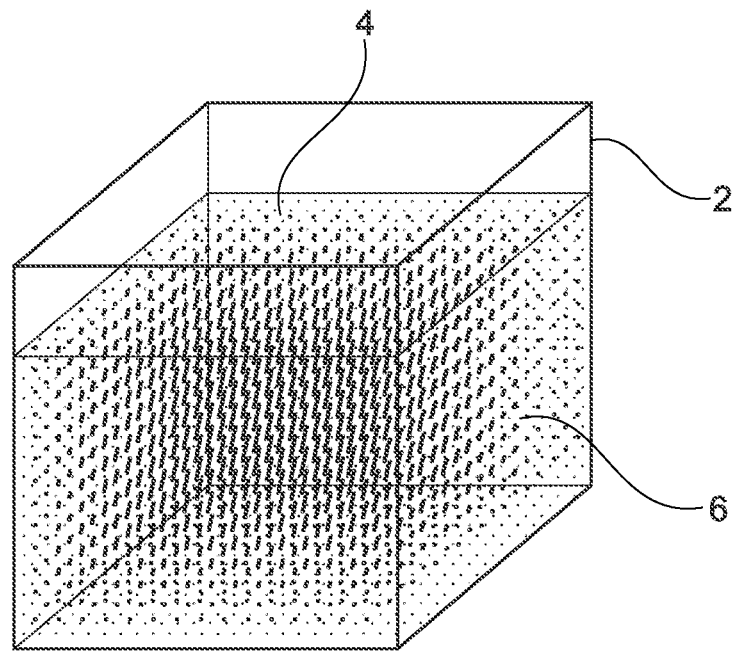

This situation is depicted in FIG. 2. In the container 2 there is now a mixture of the support medium 4 and the particles 6, which are homogeneously distributed in the support medium 4. For reasons of graphic representability and clarity, the individual particles 6 are shown at an equidistant distance from each other, i.e. on the basis of a grid. This is not the case in reality and is only intended to illustrate the presence of a homogeneous distribution, for example the number of particles 6 in a unit volume is constant. Alternatively or additionally, the entire mass of particles 6 in such a unit volume could also be constant. This is also referred to as homogeneous distribution.

Figure 3:
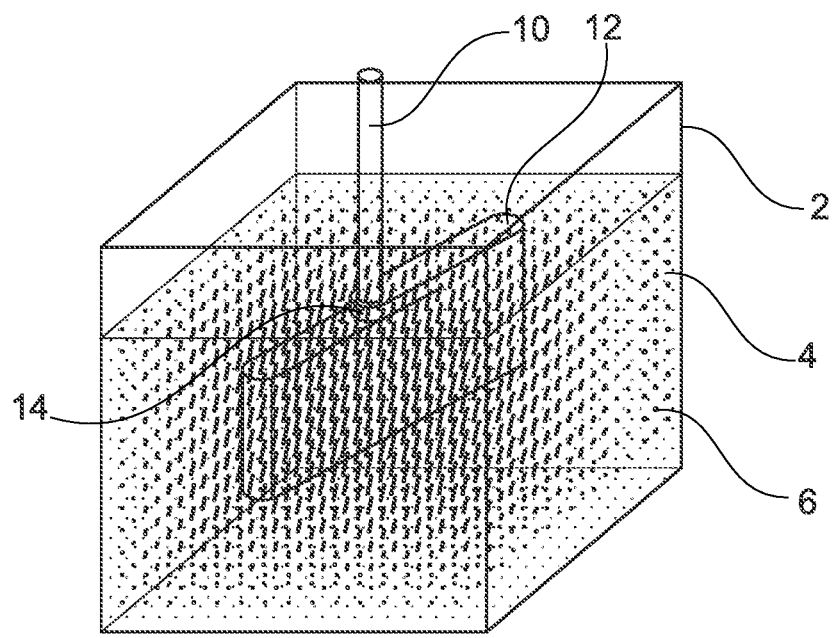

FIG. 3 schematically shows how a production material 12 is introduced into the prepared container 2, which contains the support medium 4 and the particles 6, by means of an insertion nozzle 10. Due to the physical and chemical properties of the materials used as support medium 4 and production material 12, the production material 12 introduced by way of the insertion nozzle 10 remains in the respective introduction position. FIG. 3 shows that the production material 12 is introduced in individual layers 14 or plies and the product to be produced thus built up. The thickness of such a layer 14 preferably corresponds at least largely to the diameter of the insertion nozzle 10. A part of the support medium 4 is displaced by the introduced production material 12. The corresponding particles 6 located in the displaced part of the support medium 4 are also displaced at the same time. However, they remain in contact with the introduced production material 12.

If the flat product shown were to be produced horizontally in the container 2, for example, the insertion nozzle 10 would displace the support medium 4 and thus also the particles 6 in the area above the product when introducing the production material 12. Therefore, in this case, the upper side would receive less structure or texturing from the particles 6 than the opposite lower side. In the orientation of the product shown, the strength of the structuring effect is the same on both sides when the particles 6 are homogeneously distributed in the support medium. As a result, the structure can be influenced by the orientation of the product to be produced in the support medium 4 and the path covered by the insertion nozzle 10.

Figure 4:
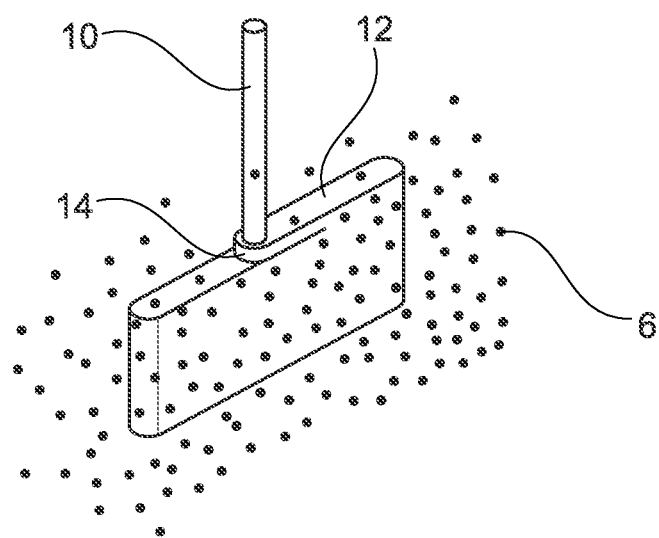

FIG. 4 depicts a schematic section from FIG. 3 so as to render the details more clearly visible. Production material 12 is introduced through the insertion nozzle 10 into the support medium 4, not shown in FIG. 4, where the particles 6 are situated. In FIG. 4, the upper-most layers 14 are just halfway finished. The insertion nozzle will continue to move to the left as it progresses, completing the layer 14. In the same way that the support medium 4 remains in contact with the production material 12 until the production material 12 cures, some of the particles 6 are also in contact with the production material 12. However, since these have a considerably higher strength than the support medium 4 and cannot change their geometric shape, they leave a structure in the surface of the product to be produced.

Figure 5:
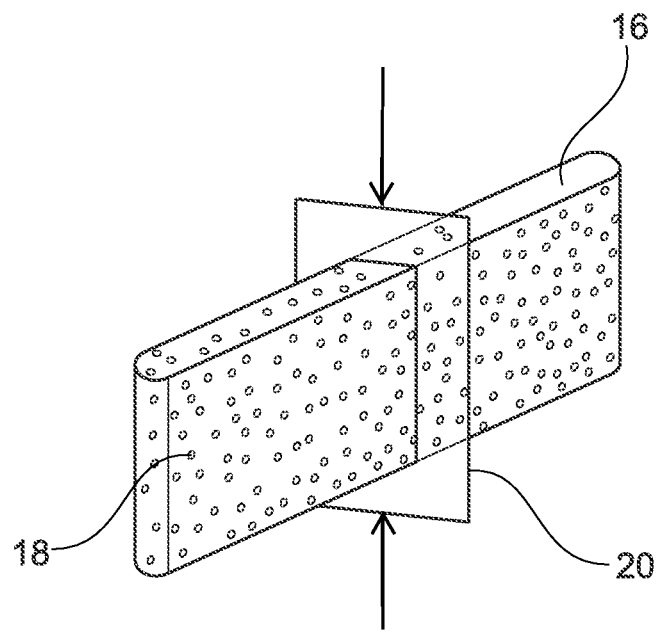

This is shown in FIG. 5. It depicts a product 16 that has been formed from the cured production material 12. At the points where the production material 12 was in contact with one of the particles 6 as it was cured, there is now a dent 18 whose size and shape depends on the size and shape of the respective particle 6. The number of dents and their distribution depends on the density and quantity of the particles 6 that were distributed in the support medium 4. A sectional plane is schematically represented by a frame 20.

Figure 6:
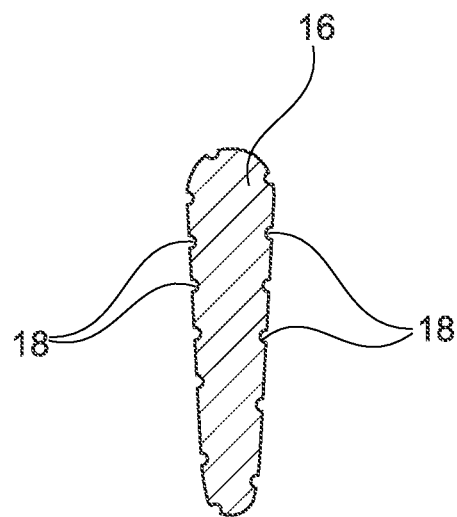

FIG. 6 depicts a section through the product 16 along this sectional plane. On the outside the various dents 18 caused by the particles 6 can be seen. Together, these dents 18 are referred to as structure or also microstructure. Through the careful selection of the path along which the insertion nozzle 10 is moved through the support medium 4 in order to introduce the production material 12 into the support medium 4, the structure, i.e. in particular the number and/or depth of the dents 18 on a first side, for example left, of the product 16 can be designed to be more pronounced than on the opposite second side. This enables a product 16 to be produced that, for example, only features such a structure on one side, while it is not present or only very weakly present on the opposite side. This can be achieved even though the particles 6 were homogeneously distributed in the support medium 4.

REFERENCE LIST 2 container
4 support medium
6 particle
8 arrow
10 insertion nozzle
12 production material
14 layer
16 product
18 dent
20 frame

The invention claimed is:

1. A method for producing a three-dimensional product, comprising:
   introducing a production material by at least one insertion nozzle into a mixture of support medium and particles made of solid matter, wherein the support medium is configured to be capable of mechanically supporting the production material in an absence of the particles; and curing the production material to produce the three-dimensional product, wherein the particles have an average grain size of 10 μm to 10 mm, and wherein at least some of the particles affect a surface texture of the three-dimensional product by protruding into the production material and leaving structures in the three-dimensional product.

2. The method according to claim 1 wherein the particles are distributed in a spatially homogeneous manner in the support medium before the production material is introduced into the support medium.

3. The method according to claim 1 wherein the particles are distributed in a spatially inhomogeneous manner in the support medium according to a predetermined spatial distribution before the production material is introduced into the support medium.

4. The method according to claim 1 wherein the particles are displaced with the support medium when the production material is introduced into the support medium so that a number and/or depth of particle protrusions into the production material on a first side of the three dimensional product to be produced is smaller than a number and/or depth of particle protrusions into the production material on a second side of the three dimensional product that is opposite the first side.

5. The method according to claim 1 wherein the at least one insertion nozzle features a tool that is arranged such that at least one part of a surface of the support medium is smoothed by the tool.

6. The method according to claim 1 wherein the at least one insertion nozzle has a particle nozzle through which the particles made of solid matter are introduced into the support medium in front of the insertion nozzle in a direction of movement of the insertion nozzle.

7. The method according to claim 1 wherein the average grain size is 0.1 mm to 5 mm.

8. The method according to claim 1 wherein the average grain size is 0.2 mm to 0.63 mm.

9. The method according to claim 1 wherein at least 80% of the particles of solid matter are spattered or dendritic in form.

10. The method according to claim 9 wherein at least 95% of the particles of solid matter are spattered or dendritic in form.

11. The method according to claim 1 wherein the particles of solid matter are plastic particles and/or quartz sand particles.

12. The method according to claim 1 wherein the particles of solid matter have a density between 0.7 g/cm$^3$ and 1.3 g/cm$^3$ and/or the density of the particles and a viscosity of the support medium are such that the particles remain under the influence of gravity in-situ.

13. The method according to claim 1 wherein the particles of solid matter exhibit a wettability that prevents an adhesion and/or embedding in the production material.

14. The method according to claim 1 wherein the particles of solid material have an interfacial tension of less than 400 mN/m.

15. The method according to claim 1 wherein the particles of solid material have an interfacial tension of less than 100 mN/m.

16. The method according to claim 1 wherein the particles of solid matter in the support medium and during contact with the production material behave in a chemically inert manner.

17. The method according to claim 1 wherein the particles of solid matter comprise at least two different types of particles.

18. The method according to claim 17 wherein one type of particle of the at least two different types of particles is approximately spherical and wherein a second type of particle of the at least two different types of particles is approximately rod-shaped.

19. The method according to claim 1 wherein structures introduced into the three dimensional product by the particles of solid matter are smaller than a diameter of the production nozzle.

20. The method according to claim 1, wherein the particles are a granulate and the particles behave in a chemically inert manner with respect to both the support medium and the production material.

21. The method according to claim 1, wherein the support medium behaves like a liquid with respect to the at least one insertion nozzle moving through the support medium at a predetermined minimum speed, and the particles, due to their property as solids, are displaced by the insertion nozzle and/or the introduced production material without changing in shape or volume.

22. The method according to claim 1, wherein the support medium is a gel suspension, and the particles are suspended by the gel suspension.

* * * * *